(12) United States Patent
Lee

(10) Patent No.: US 7,434,155 B2
(45) Date of Patent: Oct. 7, 2008

(54) ICON BAR DISPLAY FOR VIDEO EDITING SYSTEM

(75) Inventor: Sam Lee, Naperville, IL (US)

(73) Assignee: Leitch Technology, Inc., Naperville, IL (US)

(*) Notice: Subject to any disclaimer, the term of this patent is extended or adjusted under 35 U.S.C. 154(b) by 574 days.

(21) Appl. No.: 11/098,356

(22) Filed: Apr. 4, 2005

(65) Prior Publication Data

US 2006/0224940 A1    Oct. 5, 2006

(51) Int. Cl.
*G06F 15/00* (2006.01)
*G06F 17/00* (2006.01)

(52) U.S. Cl. .................... 715/203; 715/204; 715/208; 386/92; 386/66; 386/85; 348/423.1

(58) Field of Classification Search .............. 715/530, 715/500, 500.1; 348/423.1; 386/92, 66, 386/85

See application file for complete search history.

(56) References Cited

U.S. PATENT DOCUMENTS

| | | | | |
|---|---|---|---|---|
| 6,687,664 | B1* | 2/2004 | Sussman et al. | 704/201 |
| 2002/0163963 | A1* | 11/2002 | Moote et al. | 375/240 |
| 2004/0027371 | A1* | 2/2004 | Jaeger | 345/716 |
| 2004/0267953 | A1* | 12/2004 | Dunbar et al. | 709/231 |
| 2006/0184684 | A1* | 8/2006 | Weiss et al. | 709/231 |

OTHER PUBLICATIONS

Final Cut Pro 4, Nov. 2003, Apple, Product Overview, pp. 1-58.*

* cited by examiner

*Primary Examiner*—Stephen Hong
*Assistant Examiner*—Nathan Hillery
(74) *Attorney, Agent, or Firm*—Husch Blackwell Sanders LLP

(57) ABSTRACT

A method and apparatus are provided for editing video sequences. The method includes the steps of providing a display with a plurality of audio/visual sequences depicted on the display where each audio/visual sequence of the plurality of audio visual sequences is displayed as a timeline parallel to a first axis and where each position along the timeline corresponds to a temporal location of audio/visual information within the audio/visual sequence and where the plurality of audio/visual sequences overlap along the first axis, providing a scrubhead line that extends across the plurality of timelines and that is adapted to be moved relative to the timelines of the plurality of audio/visual sequences and simultaneously displaying audio/visual information from each of the plurality of audio/visual sequences within a respective window of the audio/visual sequences where the displayed information corresponds to a location of the scrubhead line along the respective timeline of the plurality of audio/visual sequences.

36 Claims, 10 Drawing Sheets

ICON BAR DISPLAY FOR VIDEO EDITING SYSTEM

FIELD OF THE INVENTION

The field of the invention relates to video editing and more particularly to computer based systems for editing video, audio and metadata.

BACKGROUND OF THE INVENTION

Computer based systems for editing and composing audio visual work have existed for over a decade. Recent systems convert audio visual signals from a diverse set of external sources such as camcorders, VCRs, DVDs, MPEG streams, digital satellite signals, streaming web video etc. into specific digital formats to save onto mass storage devices, such as hard disks, in anticipation of further processing.

Analog video signals are received by the computer for conversion one image (i.e. frame) at a time at various rates. For example, standard NTSC television video comes, in at a rate of 29.97 frames per second. Other standards support different frame rates as well as different frame sizes. Each one of these frames is converted into a digital representation of the frame and stored in a file containing a time sequential group of frames (video sequence or clip). A video sequence can be identified by the particular file name in which it is held or via some additional descriptive information (metadata). Metadata can be any data which relates to the individual frames in an audio-video sequence or the entire sequence itself. For example, the original "tape name", comments, location information, even global positioning system data etc. can be stored with the resultant video sequence and used to help organize and make future editing decisions. A video editor may be giving a metadata reference to identify some particular footage useful for a specific program. Metadata can be embedded with the audio video frames providing additional information. Frame accurate "time codes" can be associated with individual frames within a clip to precisely identify the point where an event takes place. For example, tape name: SuperbowlXX, timecode 00:12:41:15 can be used to identify the exact point in the video clip where the kick off in Superbowl 20 occurs. See FIG. 1.

The video editor relies on visual, audio and metadata cues during the editing process to identify the exact points in time to make editing decisions. These decisions include trimming, deleting, positioning, adding effects, overlaying graphics, incorporating sound effects, etc. into the resultant video.

A common method used to help identify clips employs small reference pictures (or picture icons, aka picons) from the video. However, since North American television transmits a standard definition video signal at a rate of almost 30 frames every second, even short video clip of several seconds may contain 100s of frames. Clips that are several minutes in duration will contain 1000s of frames. In order to physically fit these pictorial frame representations within a clip to be presented on a computer display, only a small subset of the actual frames are shown. The example in FIG. 2 shows a 3 second clip consisting of 900 actual frames represented by only 6 frames (i.e. only one out of 150 frames are used). Typically, the user interface for video editing utilizes computer displays to represent media and their relative temporal positions within a timeline metaphor. Clips can be placed in a sequential fashion from left (earlier in time) to right (later in time) representing the flow of the particular story being told. For example, the following parts of the video story will typically be placed sequentially from left to right respectively on a timeline: Title, Introduction, Scenes 1, 2, 3 . . . N, Ending, and Credits. See FIG. 3. Note that spaces can also be present between clips. These spaces are typically filled with black video frames.

FIG. 3 represents a single track timeline where clips are simply arranged in tandem sequential order on the horizontal or X axis.

Current state of the art computer editing systems employ what is commonly known as a Preview window to provide feedback to the operator during the editing process. The Preview window displays the frame of video at the point of where the Scrubhead is located. Note that typical editing systems utilize a combined Scrubhead/Playhead control which serves a dual role; displaying the current position of the timeline during playback and the current position of the timeline for editing. Since we are describing editing systems which allow editing during playback, we shall split up these two functionalities such that the Scrubhead shall describe the current edit position while the Playhead shall describe the current point in time on the timeline where video is being output (or played) from the video editing system. In FIG. 3, if the Scrubhead is at position x, the Preview window will display a single frame from the Intro clip referenced at time=x. Similarly, if the Scrubhead is at position y, the Preview window will display a single frame from the Scene 2 clip. Typically, Preview windows are separate windows on the computer display interface. They are effective in providing single point feedback especially on single track timelines.

Modern video editing systems support multiple tracks consisting of video, audio, graphics, titles, effects etc. In a multi-track timeline paradigm, vertical or Y axis is used to represent layers of video, audio, graphics, titles, effects etc. clips. See FIG. 4.

In a multi-track timeline, different clips can be played at the same point in time using layering effects. For example, these effects include transitions, picture in picture, transparency, overlays etc. In FIG. 4, at time=a, video clip X may be transitioning to video clip Y. Common transitions include wipes, fades or complex 3D effects. At time=b, title A is placed in front of (i.e. overlaid) on top of video clip Y. At time=c, graphics A is placed in front of video clip Z. These are simple examples of the many overlay possibilities in a multi-track timeline. In addition to the visual clips demonstrated in FIG. 4, audio clips, metadata clips as well as virtual placeholder clips can be combined in a such a similar fashion.

Again, a Preview window is utilized to provide feedback to the operator in a multi-track timeline. However, since there can be multiple clips at any one point in time, the Preview window provides feedback consisting of the combined output. Using the example in FIG. 4, at time=a, the Preview window will provide a visual frame consisting of both video clip X and video clip Y part way through a transition. At time=b, the Preview window will display Title A overlaid on top of video clip Y. At time=c, the Preview window will display graphics A in front of video clip Z. FIG. 5 shows the Preview window at the above three points in time.

Although effective in providing "combined" feedback consisting of the sum of all the layers at a point in time, the Preview window does not provide precise information at each particular layer of the composite.

Accordingly, it is an object of this invention to provide better feedback for each individual layer at any single point in time on a timeline used in the field of video editing.

SUMMARY OF THE INVENTION

A method and apparatus are provided for editing video sequences. The method includes the steps of providing a display with a plurality of audio/visual sequences depicted on the display where each audio/visual sequence of the plurality of audio visual sequences is displayed as a timeline parallel to a first axis and where each position along the timeline corresponds to a temporal location of audio/visual information within the audio/visual sequence and where the plurality of audio/visual sequences overlap along the first axis, providing a scrubhead line that extends across the plurality of timelines and that is adapted to be moved relative to the timelines of the plurality of audio/visual sequences and simultaneously displaying audio/visual information from each of the plurality of audio/visual sequences within a respective window of the audio/visual sequences where the displayed information corresponds to a location of the scrubhead line along the respective timeline of the plurality of audio/visual sequences.

The method may further include the steps of displaying time rectangles of a video sequences on a timeline (a.k.a. video clips) and placing icons, corresponding to a specific time, adjacent to two or more tracks on the timeline. These icons are physically aligned in such a way (e.g. in a BAR fashion) to make easy visual association with each media layer on the timeline. Each icon represents information pertaining to a specific time on the timeline and can include: the actual media (video, audio, graphics or titles) or metadata (information about the media).

DETAILED DESCRIPTION OF A PREFERRED EMBODIMENT

Figure 1:
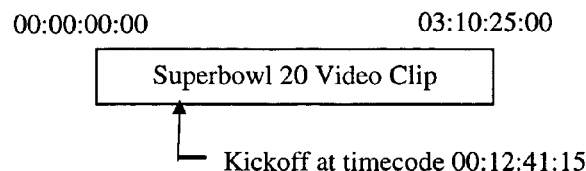
FIG. 1 is a timecode that may be used by the system of FIG. 6.
Figure 2:
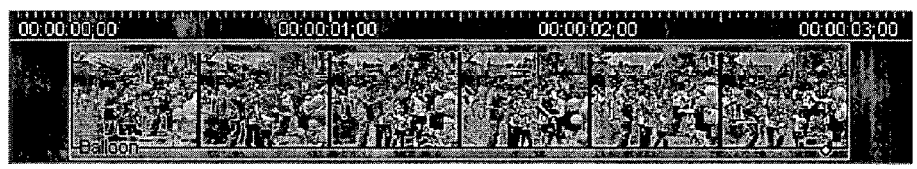
FIG. 2 is a video clip represented by 6 small picons on a computer display that may be used by the system of FIG. 6.
Figure 3:
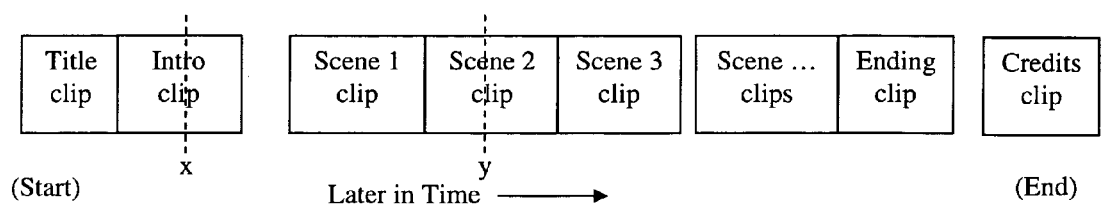
FIG. 3 is a single track timeline metaphor used in video editing that may be used by the system of FIG. 6.
Figure 4:
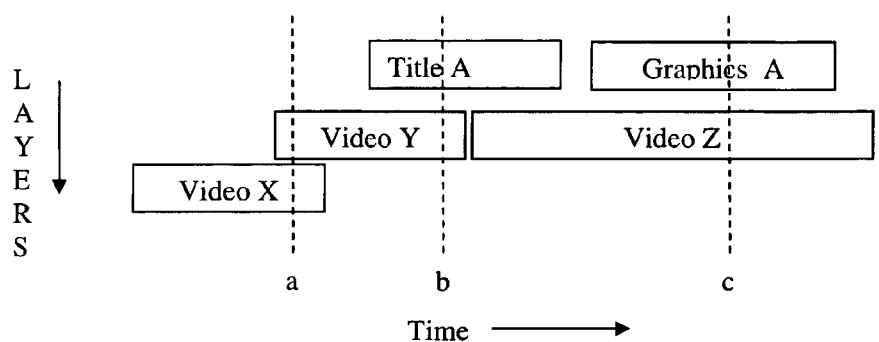
FIG. 4 is a multi-track timeline metaphor used in video editing that may be used by the system of FIG. 6.
Figure 5:
FIG. 5 are preview window displays at three different points in time (from left to right): time=a, horizontal wipe transition between video clip CX and video clip Y; time=b, title A overlaid on top of video Y; time=c, graphics A (ying-yang symbol in front of video clip Z) that may be used by the system of FIG. 6.
Figure 6:
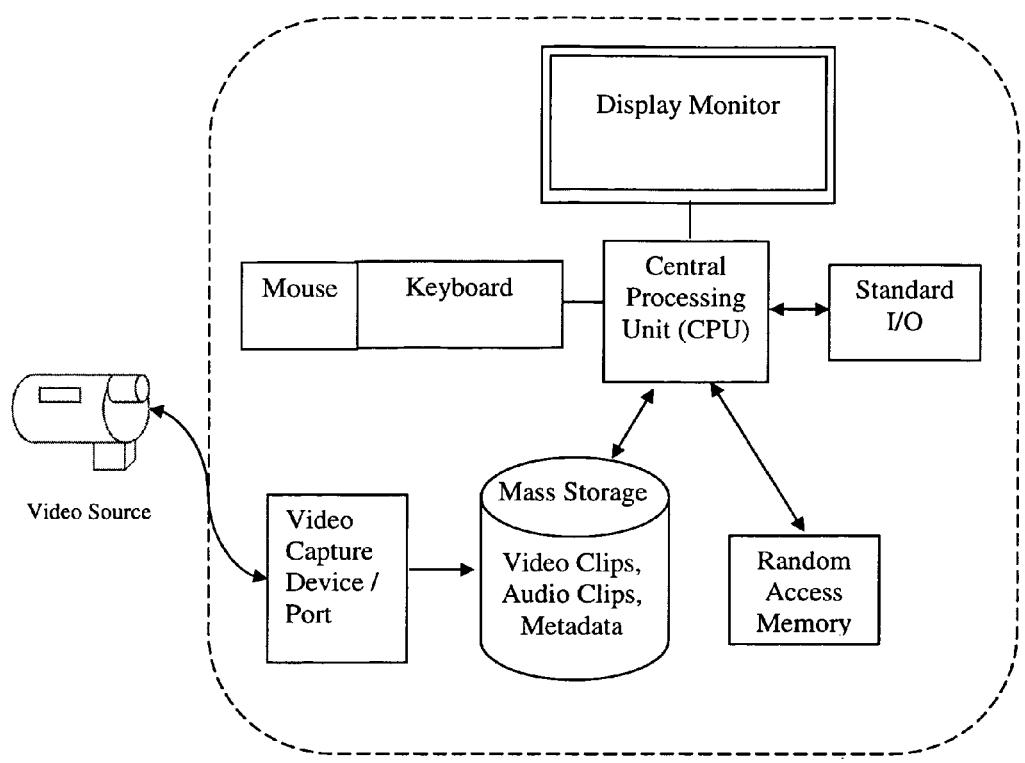
FIG. 6 is a block diagram of typical video editing system in accordance with an illustrated embodiment of the invention.

FIG. 6 is a block diagram of a video editing system 10 for editing audio/visual sequences, shown generally in accordance with an embodiment of the invention. The video editing system 10 may be used for editing video sequences and/or video sequences. As used herein, an edited video is a composite of a number of source audio/visual sequences that follows a predetermined storyline.

Included within the video editing system is a Central Processing Unit (CPU) 12 such as Intel's Pentium family, AMD's Athlon, Apples G5 etc. running under an appropriate operating system such as Microsoft Windows, Linux, or Apple's OS X and application software for performing the editing steps of the inventive process. Associated with the CPU is a mass memory storage device (i.e. hard drive) 14 and Random Access Memory (RAM) 16 for long and short term storage of audio and video source files (clips), interim audio visual results, and the final edited output files. A display monitor (e.g. cathode ray tube or liquid crystal display) 18 is provided for the visual presentation of video clips and as a visual aide in the assembly and editing of the final product. A keyboard 20 and mouse 22 are used for manipulation and control of the editing process.

Also included within the video editing system is a video capture interface 24 for converting signals from various video sources 26 such as camcorders, video tape recorders, live video feeds, digital video disc players etc. into an appropriate digital format for storage within the mass storage 14 and RAM 16. As each file or clip is captured and stored, it is given an appropriate name (e.g. clip1, clip2, superbowl1, etc.).

Data files containing an audiovisual representation of the video signal may be stored under any appropriate format know to the industry. Some example file formats are: Audio Visual Interleave (AVI), Quick Time Movie by Apple, Motion Pictures Expert Group (MPEG), MXF (Materials Exchange Format) etc. Audio information (without video) may also be obtained from the audio/video source through the capture interface. Audio information may be stored under any appropriate file type known to the industry (e.g. mp3, wav etc.). Similarly, video information (without audio) may be obtained through the video capture board and stored as a sequence of video frames (a video sequence). Other appropriate video, image, audio and graphics formats under which source files may be created include; DIB, bitmap file format (BMP) by Microsoft, FLI/FLC by Autodesk, GIF by CompuServe, PCX by Xsoft, PCT by Apple, Photo CD by Kodak, TGA by TrueVision, TIF by Aldus, JPG by Joint Photographic Experts Group. As used herein, files (of whatever type) will be referred to as clips.

Digital video segments and audio files may also be loaded for editing through standard input/output (I/O) ports 28. I/O ports may interface with any appropriate information source (e.g. floppy disk drives, PCMCIA memory cards, SCSI devices, USB keys, network connections, WIFI etc.). These I/O ports may also be used as an output for finished audiovisual work to video recipients.

Following entry of the appropriate source files, an operator (not shown) of the video editing system may access and view the video files on the display monitor in a number of formats. In one format, an area of the screen known as the timeline may be dedicated to the display of video segments. The operator may view the clip at normal broadcast video speeds (i.e. 29.97 frames per second NTSC, 25 frames per second PAL or at an appropriate HD frame rate) or at various multimedia speeds (e.g. 12 fps, 15 fps etc.). Alternatively, the operator may view the clip one frame at a time, stepping in a either a forward or backwards in time direction, under menu, keyboard or mouse control. As the operator views the clip a frame number (or Timecode) is displayed corresponding to the frame being displayed. Other data about the clip, known in general as metadata, can also be displayed. Examples of metadata include: textual descriptions, closed captions, creation information, unique IDs or any number of information associated with the video clip or the specific video frame being displayed. Upon viewing the individual frames of a video clip, the operator may perform editing operations such as deleting unwanted frames, adding new frames from the current or other clips, compositing multiple layers of video or graphics on top of the current clip, setting transition points from one clip to another or any number of other video editing operations. These editing operations can be performed on a timeline interface used to temporally as well as spatially lay out multiple video/audio/graphics clips. Editing changes can be performed while playback is stopped or during the playback of the clip(s) or entire timeline involved.

To create an edited video, various procedures can be applied. One typical strategy is to pre-sequence the main video clips by creating a rough storyboard. In this strategy, the operator gathers the required source clips (e.g. video clips, audio clips, graphics clips, title clips etc.) and drags the main clips into a temporal sequence in a "bin" or "gallery" window. This sequence of clips can then be sent to the main timeline window in the same temporal order for fine tuning and compositing of multiple audio/visual layers.

Figure 7:
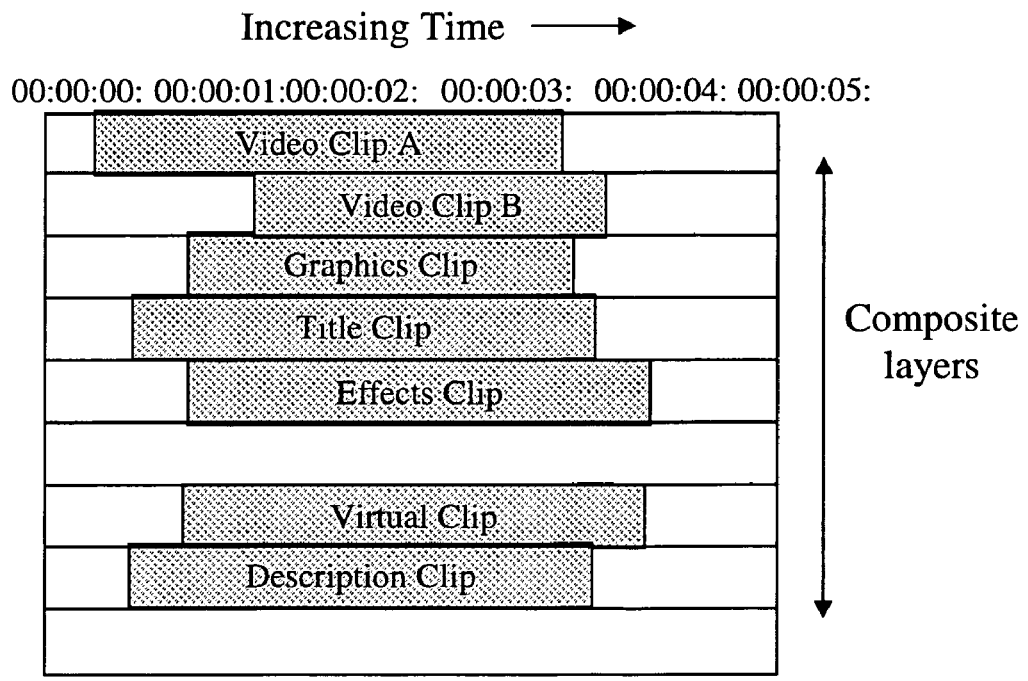
FIG. 7 is a typical timeline window on a Video Editing System Monitor of the system of FIG. 6.
Figure 8:
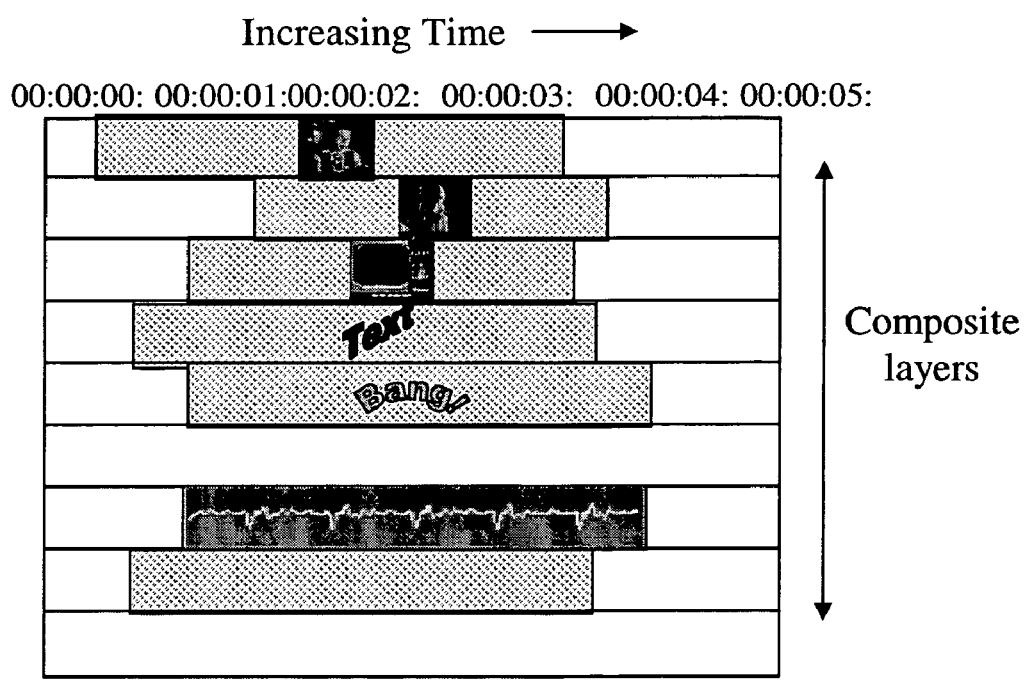
FIG. 8 is a typical method of identifying clips on a timeline using one or more individual frames of actual media on each clip used by the system of FIG. 6.
Figure 9:
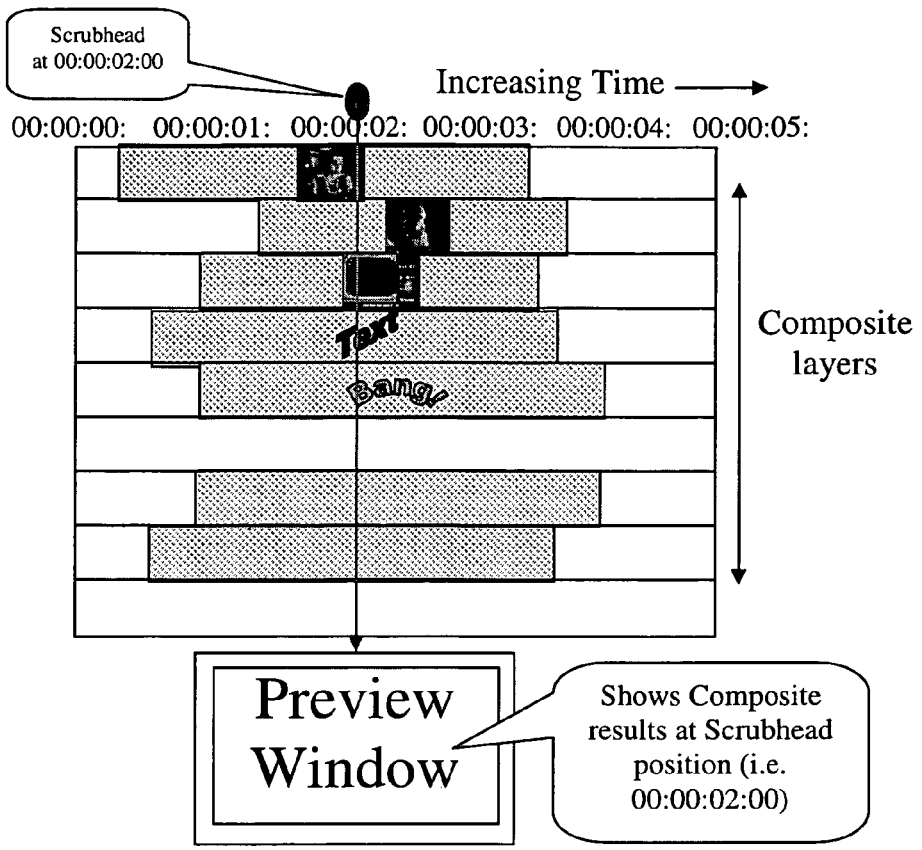
FIG. 9 is a preview window display at a Scrubhead location within the system of FIG. 6.

The timeline is the main interface where various types of clips (video, audio, graphics, titles, metadata, virtual etc.— these and other clip types can be collectively known as media clips) can be edited. As the name implies, the timeline can sequence clips in temporal order. In fact, some timelines only support a single track where clips must be placed in sequential (temporal) order. Modern timelines add another dimension of flexibility allowing the user to control the layers and align multiple clips at the same temporal point. This is achieved by adding multiple tracks in layers where various clips of differing media types can be placed (FIG. 7). A typical timeline uses the x-axis as a time scale where the right side represents a point later in time and the y-axis as a compositing mechanism where clips higher up are composited on top of the main clips (note that the order of the composited clips may be inverted depending on the paradigm used in the editing interface). As stated earlier in the background section, current mechanisms to provide synchronized temporal feedback of composited clips on a timeline have relied on an overall Preview window.

Figure 18A:
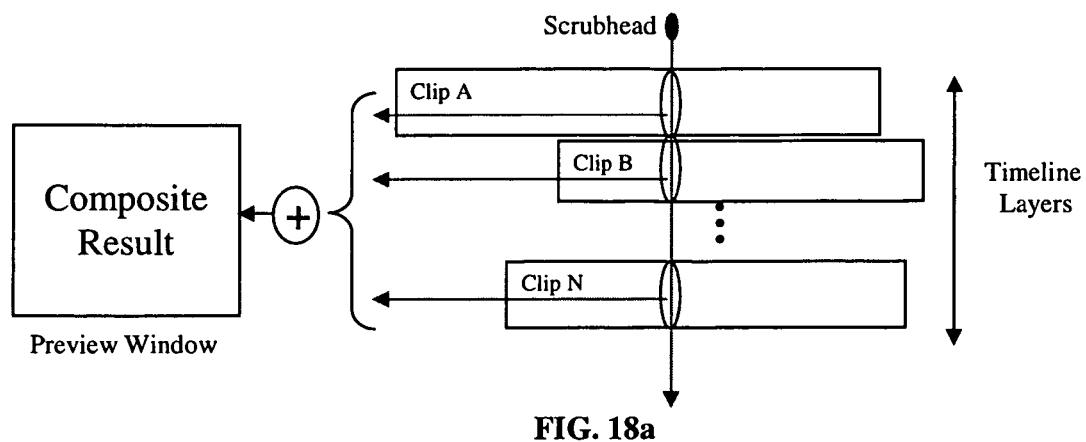
FIG. 18a shows a single frame within a composite window used by the system of FIG. 6.

This Preview window either shows a) a frame from a singular clip at a particular point in time or b) the composite result from all the clips at a particular point in time. Typically, a smaller image or icon is extracted from the actual video media and displayed in the Preview window providing the editor with the necessary feedback for editing. The Preview window typically displays the information at the timeline Scrubhead. However, it is also common practice to utilize the Preview window to display a single frame from an individual clip during editing operations such as trimming (e.g., see FIG. 18*a*).

Figure 16:
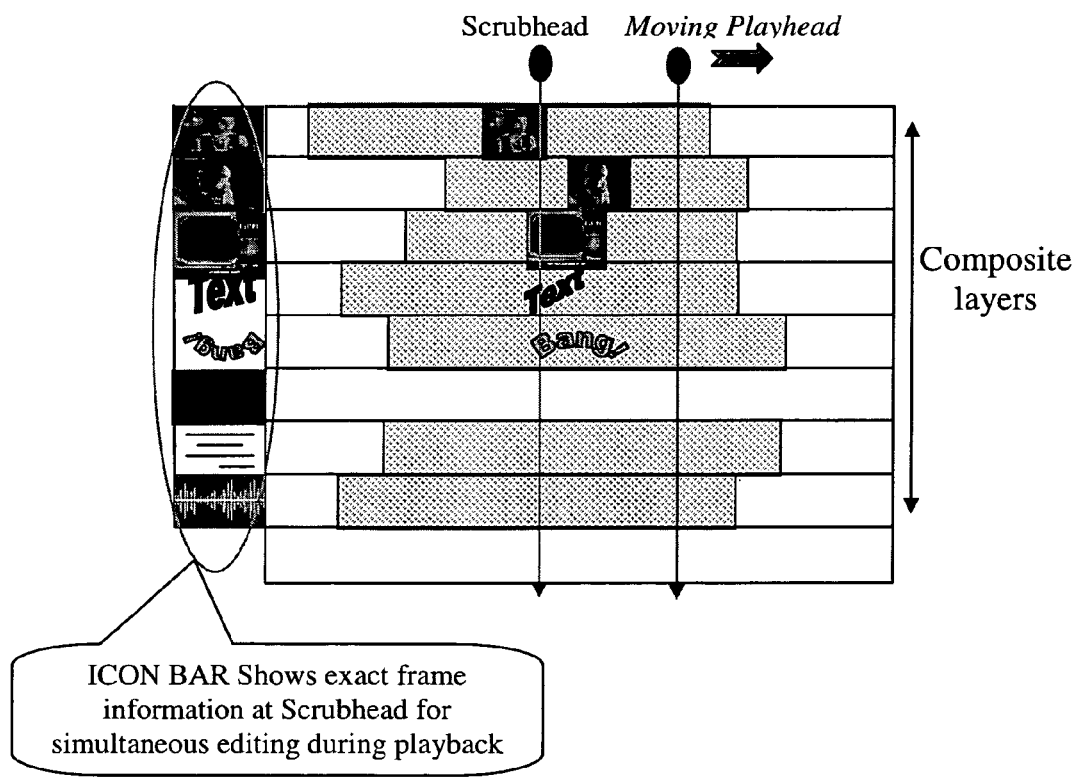
FIG. 16 is an ICON BAR of the system of FIG. 6 that shows the exact frame at a single point in time for each timeline layer at the Scrubhead location to provide feedback for simultaneous editing during playback.
Figure 17:
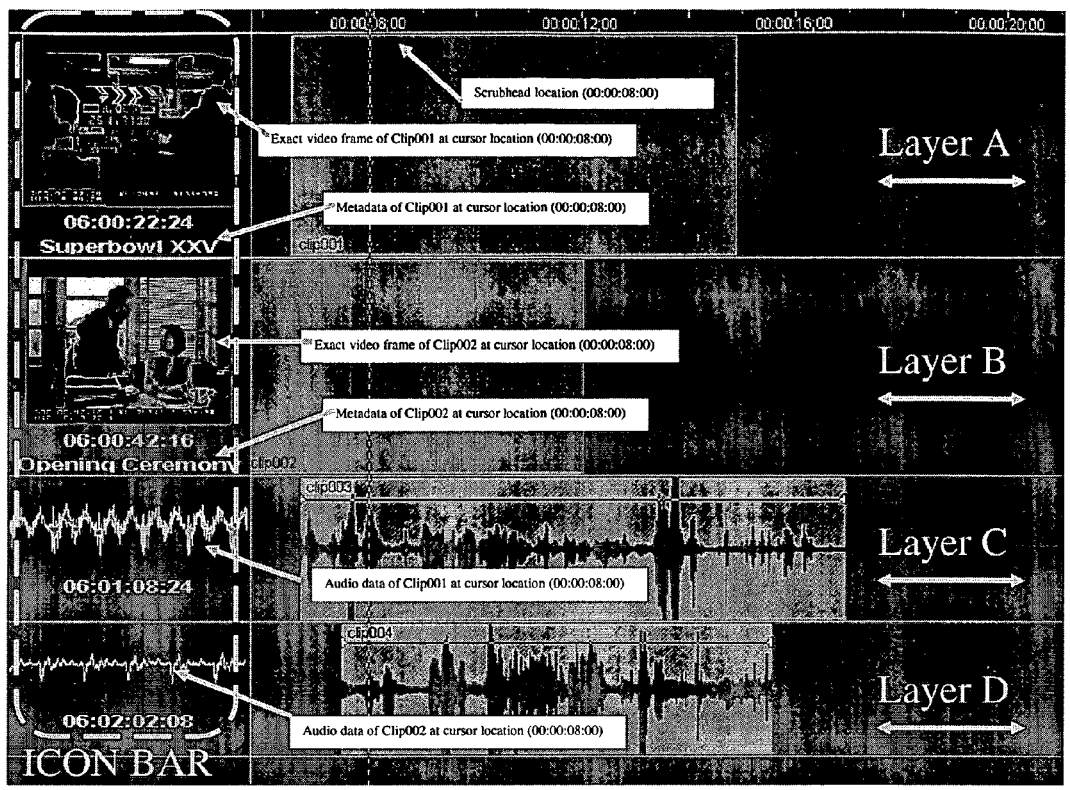
FIG. 17 is a screen shot of an embodiment of an ICON bar video editing interface of the system of FIG. 6.
Figure 18B:
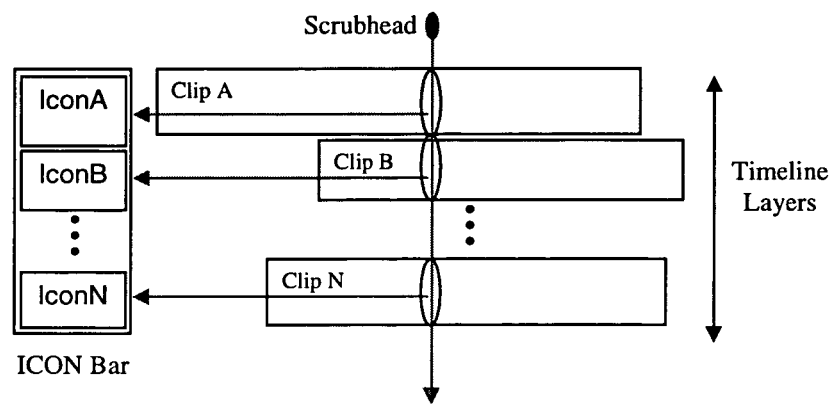
FIG. 18b shows the simultaneous display of frames from different timelines displayed by the system of FIG. 6.

Under illustrated embodiments of the invention, the ICON BAR provides a method to visually examine the contents of multiple media clips at a specific point in time simultaneously (FIG. 16, FIG. 18*b*). This is done by providing multiple icons associated with each individual track of a timeline and updating them in a synchronous manner. Thus an operator can scrub (i.e., move) the Scrubhead until the information in the Icon Bar displays the desired feedback for all media on the timeline at the Scrubhead location. For example, an editor may want to cut away sections of a production where the audio is silent and video just shows black. To do this, the operator simply scrubs the Scrubhead across the timeline until no audio and blank (e.g. black) video is displayed in the individual icons of the Icon Bar. As the operator continues to scrub, the beginning and ending time of the blank section can be identified and marked for deletion. The edited clips may be moved to the right and left to correct timing deficiencies created by the editing.

The Icon Bar can display different types of information depending on the clip and where it intersects the Scrubhead. Samples of information that the ICON BAR can display include picture icons, scaled graphics, audio wave form and metadata.

The point in time of interest is controlled by the user via the keyboard, mouse or other selection device and is displayed on the computer's monitor by a timeline cursor (also known as the Scrubhead). The act of moving this Scrubhead forward or backwards in time is known as scrubbing the timeline. Scrubbing can be utilized to select different points in time for the purposes of editing or playback. For example, an operator can remove all material before time 00:00:02:00 by performing the following two steps: 1) moving the Scrubhead to this point in time and invoking the slice operation to cut all the media on the timeline at this precise point and 2) selecting all clips and sliced portions of clips prior to 00:00:02:00 and performing the delete operation. In this simplified example, we used a particular point in time (i.e. 00:00:02:00) as a reference for deleting clips on the multiple layers of a timeline. However, it is very common for a video editor to determine the exact cut point based on the actual material in each media clip.

In this embodiment of the invention, the operator uses the mouse to select the timeline's Scrubhead and proceeds to drag it left or right, increasing or decreasing the point in time (scrubbing) being referenced. The ICON BAR is updated 1) during the actual scrubbing action, providing interactive feedback to the operator as he moves to different points on the timeline and 2) when the Scrubhead is placed (or dropped) at a specific point in time on the timeline. There can be options to display different information on the ICON BAR. However, the typical information displayed is as follows based on the type of media on the timeline track where the Scrubhead intersects.

Figure 10:
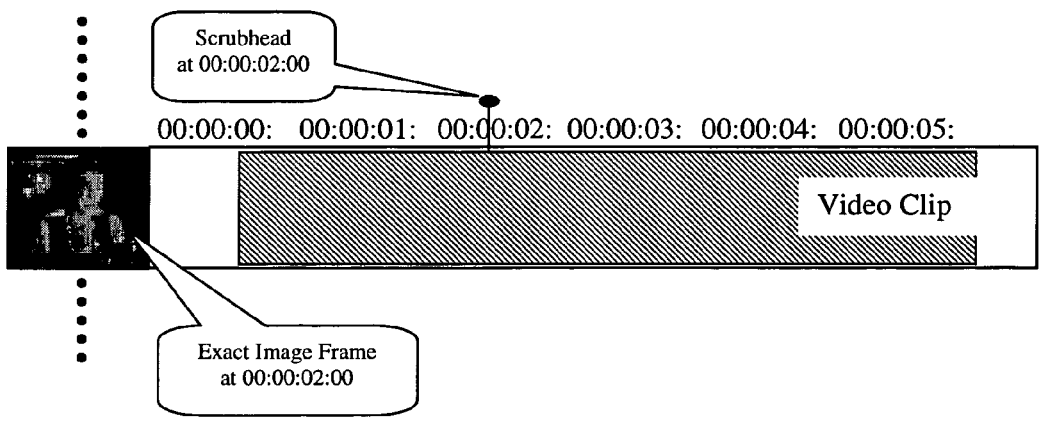
FIG. 10 is a single track of a timeline in which cursor controlled video frame display of the system of FIG. 6 shows the display exact frame information at Scrubhead location.

For video clips, the corresponding icon on the ICON BAR can be used to display a smaller sized image of the frame at the Scrubhead location (FIG. 10). Since video clips are composed of a series of individual images (or frames), the Scrubhead will intersect a video clip at exactly one frame at one point in time (i.e. the selected frame). This selected frame is then read from its storage location (typically on the computer's hard drive, a shared drive on the network, in memory, over the internet etc.) and resized to the appropriate dimensions for display in the ICON BAR. This resizing is typically done via image processing techniques under control of the video editing application software. Optionally, the video editing software can allow variable icon sizes to be displayed as desired by the operator.

Figure 11:
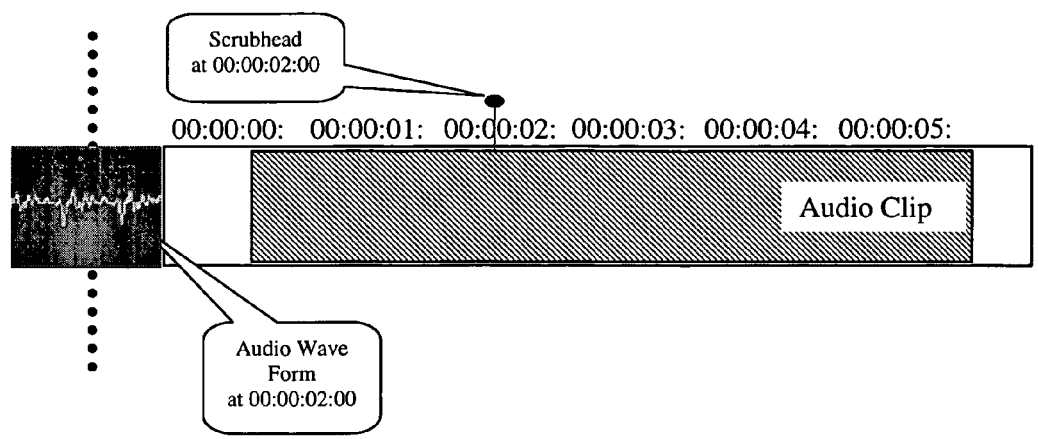
FIG. 11 is a single track of a timeline in which the cursor controlled audio frame display of the system of FIG. 6 shows the exact frame information at Scrubhead location.

For audio clips, the corresponding icon on the ICON BAR can be used to display a waveform representation of the audio at the Scrubhead location (FIG. 11). Since audio is typically recorded with over a 1000 samples for each frame of video, the waveform drawing is used to provide a visual representation of these samples in a way that is easy to understand. The samples of audio used to create the waveform drawing correspond to the sound at or around the Scrubhead location in the media. These samples are read from its storage location (typically on the computer's hard drive, a shared drive on the network, in memory, over the internet etc.). This drawing is typically done under control of the video editing application software. Optionally, the video editing software can allow variable icon sizes and scales to be displayed as desired by the operator.

Figure 12:
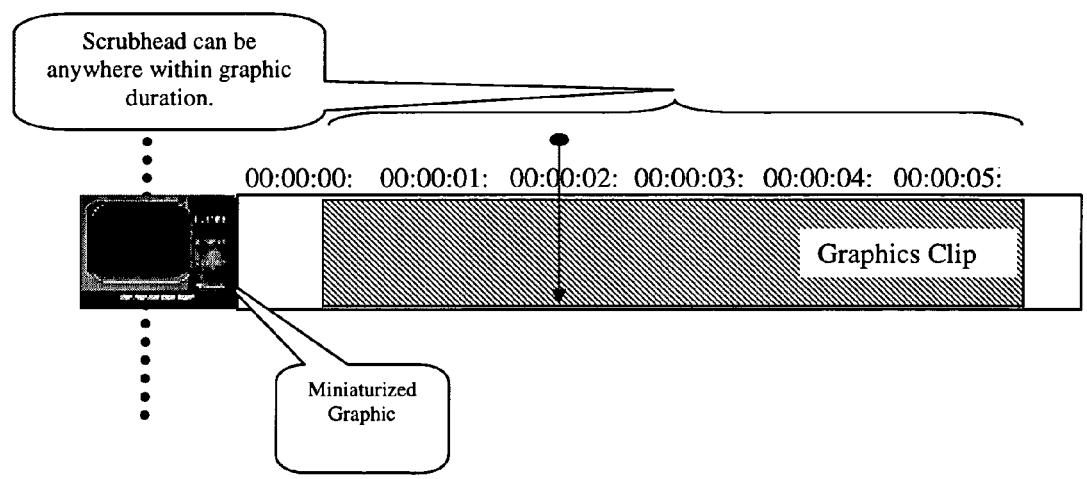
FIG. 12 is a single track of a timeline of the system of FIG. 6 in which the graphics do not change.

For still graphics clips, the corresponding icon on the ICON BAR can be used to display a miniature sized image of the full graphic (FIG. 12). Since still graphics clips consist of a single non-changing image repeated through multiple frames of video, this image is used to represent the entire graphics clip as the Scrubhead moves over it. The graphic frame is read from its storage location (typically on the computer's hard drive, a shared drive on the network, in memory, over the internet etc.) and resized to the appropriate dimension for display in the ICON BAR. This resizing is typically done via image processing techniques under control of the video editing application software. Optionally, the video editing software can allow variable icon sizes to be displayed as desired by the operator.

Figure 13:
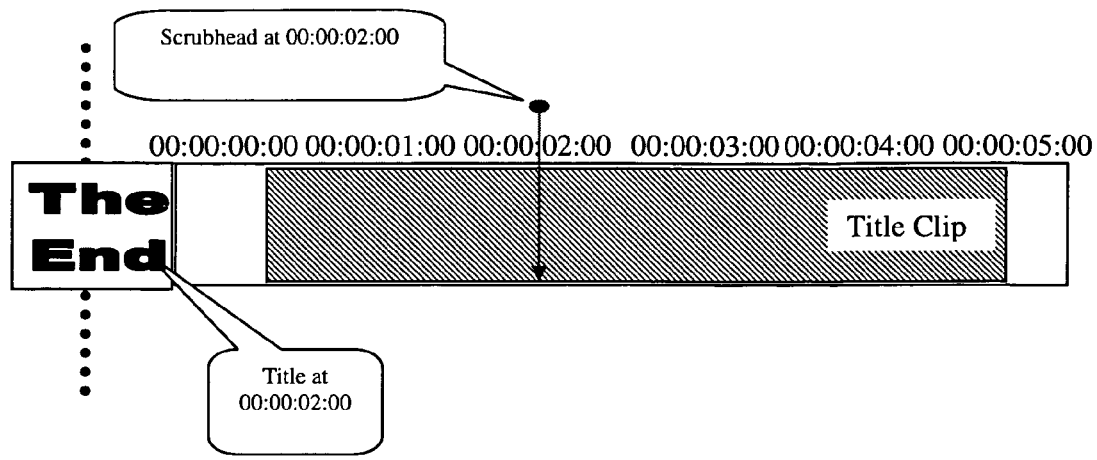
FIG. 13 is a single track of a timeline of a cursor controlled still title display of the system of FIG. 6 using picture ICON to display exact text information at Scrubhead location.

Title clips can be handled in a similar way to either video clips or graphics clips based on whether the title is stationary or dynamic. Stationary title clips do not change from one video frame to another and thus are similar to still graphics (FIG. 13). On the other hand, titles can have motion (e.g. rolls or crawls) and thus change from frame to frame. These titles can be handled in a similar way as motion video clips (FIG. 10).

In either case, the title frame is read from its storage location (typically on the computer's hard drive, a shared drive on the network, in memory, over the internet etc.) and resized to the appropriate dimension for display in the ICON BAR. This resizing is typically done via image processing techniques under control of the video editing application software. Optionally, the video editing software can allow variable icon sizes to be displayed as desired by the operator.

Figure 14:
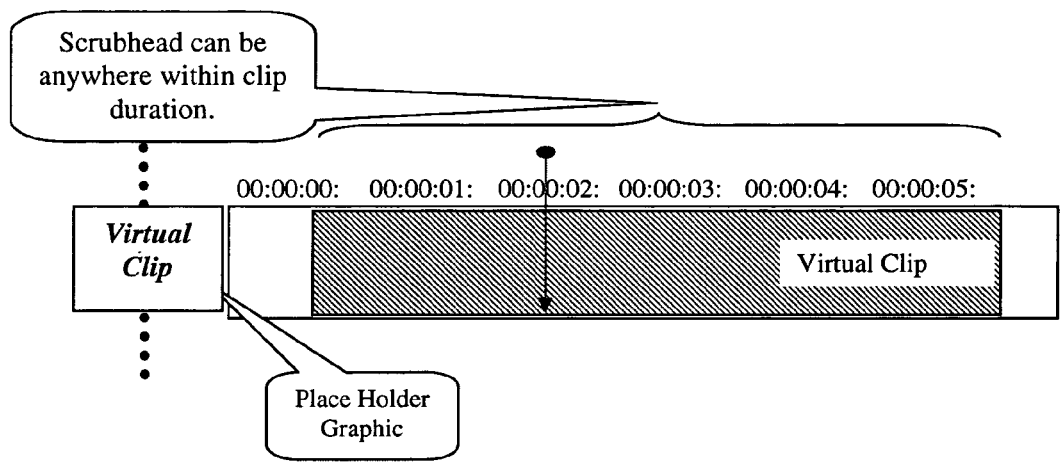
FIG. 14 is a single track of ICON BAR of the system of FIG. 6 showing a static place holder.

Virtual clips are placeholders for media that is not presently available (FIG. 14). For example, the virtual clip can represent material that has not yet been acquired or is being stored off line. In some cases, virtual clips can contain essential metadata for media which is not available. A common example of when this may happen is when the media is archived for long term storage and video project file is opened by the video editor. In this case, the video project file contains information about the actual media (e.g. Tape=Superbowl, Scene=kickoff, day=Jan. 23, 20XX, etc.). The editor can use this information to acquire the appropriate material from the archives or even use the metadata as reference for editing. For virtual clips, the actual image of the media may or may not be available. A reference image may be stored to represent the missing media or a placeholder image may be used instead.

Figure 15:
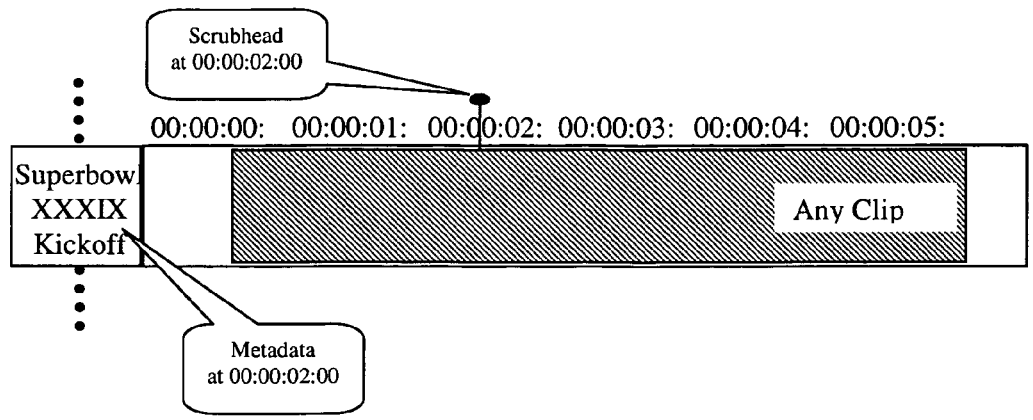
FIG. 15 is a single track of the ICON BAR of the system of FIG. 6 showing metadata displayed in the ICON BAR.

In addition to the Virtual Clip case above, metadata can also be displayed on the EYECON Bar for all other clip types (FIG. 15).

Notice that all the interactions described thus far do not preclude the notion of editing during the actual playback of the timeline. In fact, the EYECON Bar is designed to allow much better interactivity (because of its multiple simultaneous views) for the user during all phases of editing including the time when playback is occurring within the Preview Window (FIG. 16). While playing back the timeline, the EYECON Bar can optionally provide feedback at the Playhead (location where the video is playing at any moment in time) or at the scubhead as described. If the EYECON Bar is set to provide feedback at the Playhead (i.e., the scrubhead and playhead are coincident), the user can perform "on the fly" editing via the computers keyboard or other input device. For example, the user can use hit a special key on the keyboard to cut all clips on the timeline at the Playhead location based on feedback from the EYECON Bar during timeline playback. Alternatively, the EYECON Bar can provide feedback at a Scrubhead location that is different than the playhead location while playback is occurring. In this scenario, the Scrubhead can be controlled via mouse to select the point of interest totally independent of the Playhead. This gives rise to several interesting scenarios. For example, the operator can start a playback that appears on a preview monitor and then proceed to a point later in time to make editing changes before the Playhead arrives. The opposite can also occur. Adjustments and changes to the program can be made after the Playhead passes a certain point in time. The EYECON Bar provides enough simultaneous feedback to facilitate this concept of interactive editing.

A specific embodiment of novel apparatus for editing video clips according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention, any and all modifications, variations, or equivalents that fall within the true spirit and scope of the basic underlying principles disclosed and claimed herein.

The invention claimed is:

1. A method of editing video sequences, such method comprising:
  providing a display with a plurality of audio/visual sequences depicted on the display where each audio/visual sequence of the plurality of audio visual sequences is displayed as a timeline parallel to a first, time axis and where each position along the timeline corresponds to a temporal location of audio/visual information within the audio/visual sequence and where the plurality of audio/visual sequences temporally overlap along the first axis;
  providing a line that defines a scrubhead location, where the scrubhead line extends across the plurality of timelines and that is adapted to be moved relative to the timelines of the plurality of audio/visual sequences; and
  simultaneously displaying audio/visual information from each of the plurality of audio/visual sequences within a respective window of the audio/visual sequences where the displayed information corresponds to a location of the scrubhead line along the respective timeline of the plurality of audio/visual sequences wherein the scrubhead describes a current edit position on the timelines and a playhead describes a current point in time on the timelines where video is being output from the video editing system and wherein the scrubhead can be moved independently of the playhead.

2. The method of editing video sequences as in claim 1 further comprising locating the respective windows showing the displayed audio/visual information within a display area adjacent one end of a respective timeline of the plurality of timelines.

3. The method of editing video sequences as in claim 1 further comprising defining the scrubhead line as being orthogonal to the first axis.

4. The method of editing video sequences as in claim 1 further comprising providing a playhead line orthogonal to the first axis extending across the plurality of timelines.

5. The method of editing video sequences as in claim 4 further comprising displaying a storyline of the plurality of audio/visual sequences in a preview window where the displayed storyline is retrieved from the plurality of audio/video sequences based upon a temporal location of the playhead line.

6. The method of editing video sequences as in claim 5 wherein the step of displaying the storyline further comprising the playhead traversing the timelines while audio/visual information is retrieved from a temporal location within an audio/visual sequence of the plurality of audio/visual sequences that corresponds to a location of the playhead.

7. The method of editing video sequences as in claim 6 wherein the step of displaying the storyline further comprising retrieving audio/visual information from a first audio/visual sequence of the plurality of audio/visual sequences for display in the preview window until the playhead reaches a predetermined temporal location along the timeline of the first audio/visual sequence and then retrieving audio/visual information from a second audio/visual sequence of the plurality of audio/visual sequences after the predetermined temporal location.

8. The method of editing video sequences as in claim 7 further comprising coupling the scrubhead to the playhead to cause the scrubhead to traverse the timelines in conjunction with the playhead.

9. The method of editing video sequences as in claim 8 further comprising placing the scrubhead coincidental with the playhead as the scrubhead and playhead traverse the timelines.

10. The method of editing video sequences as in claim 9 further comprising editing the storyline by moving the playhead along the timelines.

11. The method of editing video sequences as in claim 9 further comprising editing the storyline using the scrubhead as the playhead traverses the timelines.

12. An apparatus for editing video sequences, such apparatus comprising:
    means for providing a display with a plurality of audio/visual sequences depicted on the display where each audio/visual sequence of the plurality of audio visual sequences is displayed as a timeline parallel to a first axis and where each position along the timeline corresponds to a temporal location of audio/visual information within the audio/visual sequence and where the plurality of audio/visual sequences overlap along the first axis;
    means for providing a line that that defines a scrubhead location, where the scrubhead line extends across the plurality of timelines and that is adapted to be moved relative to the timelines of the plurality of audio/visual sequences; and
    means for simultaneously displaying audio/visual information from each of the plurality of audio/visual sequences within a respective window of the audio/visual sequences where the displayed information corresponds to a location of the scrubhead line along the respective timeline of the plurality of audio/visual sequences wherein the scrubhead describes a current edit position on the timelines and a playhead describes a current point in time on the timelines where video is being output from the video editing system and wherein the scrubhead can be moved independently of the playhead.

13. The apparatus for editing video sequences as in claim 12 further comprising means for locating the respective windows showing the displayed audio/visual information within a display area adjacent one end of a respective timeline of the plurality of timelines.

14. The apparatus for editing video sequences as in claim 12 further comprising means for defining the scrubhead line as being orthogonal to the first axis.

15. The apparatus for editing video sequences as in claim 12 further comprising means for providing a playhead line orthogonal to the first axis extending across the plurality of timelines.

16. The apparatus for editing video sequences as in claim 15 further comprising means for displaying a storyline of the plurality of audio/visual sequences in a preview window where the displayed storyline is retrieved from the plurality of audio/video sequences based upon a temporal location of the playhead line.

17. The apparatus for editing video sequences as in claim 16 wherein the means for displaying the storyline further comprising means for allowing the playhead to traverse the timelines while audio/visual information is retrieved from a temporal location within an audio/visual sequence of the plurality of audio/visual sequences that corresponds to a location of the playhead.

18. The apparatus for editing video sequences as in claim 17 wherein the means for displaying the storyline further comprising means for retrieving audio/visual information from a first audio/visual sequence of the plurality of audio/visual sequences for display in the preview window until the playhead reaches a predetermined temporal location along the timeline of the first audio/visual sequence and then retrieving audio/visual information from a second audio/visual sequence of the plurality of audio/visual sequences after the first temporal location.

19. The apparatus for editing video sequences as in claim 18 further comprising means for coupling the scrubhead to the playhead to cause the scrubhead to traverse the timelines in conjunction with the playhead.

20. The apparatus for editing video sequences as in claim 19 further comprising means for placing the scrubhead coincidental with the playhead as the scrubhead and playhead traverse the timelines.

21. The apparatus for editing video sequences as in claim 20 further comprising means for editing the storyline by moving the playhead along the timelines.

22. The apparatus for editing video sequences as in claim 20 further comprising means for editing the storyline using the scrubhead as the playhead traverses the timelines.

23. An apparatus for editing video sequences, such apparatus comprising:
    a display provided with a plurality of audio/visual sequences depicted on the display where each audio/visual sequence of the plurality of audio visual sequences is displayed as a timeline parallel to a first axis and where each position along the timeline corresponds to a temporal location of audio/visual information within the audio/visual sequence and where the plurality of audio/visual sequences overlap along the first axis;

a line that defines a scrubhead location, where the scrubhead line extends across the plurality of timelines and that is adapted to be moved relative to the timelines of the plurality of audio/visual sequences; and an icon bar that simultaneously displays audio/visual information from each of the plurality of audio/visual sequences within a respective window of the audio/visual sequences where the displayed information corresponds to a location of the scrubhead line along the respective timeline of the plurality of audio/visual sequences wherein the scrubhead describes a current edit position on the timelines and a playhead describes a current point in time on the timelines where video is being output from the video editing system and wherein the scrubhead can be moved independently of the playhead.

24. A method of editing video sequences comprising of the following steps:

on a monitor displaying a time rectangle with a plurality of temporally overlapping parallel timelines, an icon bar, a scrubhead and a playhead extending across the plurality of timelines wherein the scrubhead describes a current edit position on the timelines and a playhead describes a current point in time on the timelines where video is being output from the video editing system and wherein the scrubhead can be moved independently of the playhead;

representing a first video sequence as a first timeline of the plurality of timelines;

displaying a version of a video frame corresponding to the first video sequence within the icon bar at a time indicated by a scrubhead location on the first timeline;

representing a second video sequence as a second timeline of the plurality of timelines;

simultaneously displaying a media frame from the second media sequence in the icon bar in a manner that is substantially identical to the display of the first video sequence, where the second media sequence is different than the first media sequence and where the displayed media frames of the first and second video sequences are selected from a single point in time among the timelines that is identified by a location of the scrubhead; and editing the video sequences based upon the simultaneously displayed media frames within the icon Bar.

25. The method as in claim 24 further comprising using a computer mouse to control the position of the scrubhead on the timeline, thus resulting in updating of all icons within the icon bar that represent the video sequences at the selected time.

26. The method as in claim 24 further comprising using a computer keyboard to control the position of the Scrubhead on the timeline, thus resulting in updating of all icons on the ICON BAR that represent the media at the selected time.

27. The method as in claim 24 further comprising using a computer cursor control device to position the Scrubhead on the timeline, thus resulting in updating of all icons on the ICON BAR that represent the media at the selected time.

28. The method as in claim 24 further comprising outputting a video program from the video editing system based on the edits made using icon bar feedback.

29. The method as in claim 24 wherein the step of editing the video sequences further comprises simultaneously playing back the timeline.

30. A method of editing audio sequences comprising of the following steps:

on a monitor displaying a time rectangle with a plurality of temporally overlapping parallel timelines, an icon bar, a scrubhead and a playhead extending across the timelines wherein the scrubhead describes a current edit position on the timelines and a playhead describes a current point in time on the timelines where video is being output from the video editing system and wherein the scrubhead can be moved independently of the playhead;

representing an audio sequence on a timeline of the plurality of timelines;

displaying a version of an audio frame corresponding to the audio sequence at the time indicated by the scrubhead location;

simultaneously displaying media frames from additional media sequences on additional timelines of the plurality of timelines where the additional media sequences are different than the audio sequence but all originate from a single point in time; and editing sequences based upon the simultaneously displayed media frames on the icon bar.

31. A method of editing graphics comprising:

on a monitor displaying a time rectangle with a plurality of temporally overlapping parallel timelines, an icon bar, a scrubhead and a playhead extending across the plurality of timelines wherein the scrubhead describes a current edit position on the timelines and a playhead describes a current point in time on the timelines where video is being output from the video editing system and wherein the scrubhead can be moved independently of the playhead;

representing a first graphic sequence as a first timeline of the plurality of timelines;

displaying a version of a graphics frame corresponding to the first graphic sequence at the time indicated by the Scrubhead location;

simultaneously displaying a media frame from additional media sequences on additional timelines of the plurality of timelines and where the additional media sequences are different than the first graphic sequence and where the displayed graphic frame and displayed media frames are selected from a single point in time among the timelines that is identified by a location of the scrubhead; and editing at least one of the graphic sequence and media sequences based upon the simultaneously displayed audible and media frames on the icon bar.

32. A method of editing titles comprising:

on a monitor displaying a time rectangle with a plurality of temporally overlapping timelines, an icon bar, a scrubhead and a playhead extending across the plurality of timelines wherein the scrubhead describes a current edit position on the timelines and a playhead describes a current point in time on the timelines where video is being output from the video editing system and wherein the scrubhead can be moved independently of the playhead;

representing a title sequence on a timeline of the plurality of timelines;

displaying a version of a title frame corresponding to the title sequence at the time indicated by a location of the Scrubhead on the timeline of the title sequence;

simultaneously displaying a media frame from additional media sequences on additional timelines of the plurality of timelines, where the additional media sequences are different than the title sequence and where the displayed frames are selected from a single point in time that is identified by a location of the scrubhead; and editing the title frame based upon the simultaneously displayed media frames on the icon bar.

33. A method of editing virtual clips comprising:

on a monitor displaying a time rectangle with a plurality of temporally overlapping parallel timelines;

representing a virtual clip on a timeline of the plurality of timelines;

displaying a version of a place holder frame corresponding to the virtual clip at the time indicated by a temporal location of the scrubhead;

displaying a line defining a playhead location extending across the plurality of timelines wherein the scrubhead describes a current edit position on the timelines and a playhead describes a current point in time on the timelines where video is being output from the video editing system and wherein the scrubhead can be moved independently of the playhead;

simultaneously displaying a media frame from additional media sequences on additional timelines of the plurality of timelines, where the virtual clip and additional media sequences are all different and where the displayed frames are selected from a single point in time identified by the scrubhead; and editing the virtual clip based upon the simultaneously displayed media frames on the icon bar.

34. A method of editing media sequences comprising:

on a monitor displaying a time rectangle with a plurality of temporally overlapping parallel timelines, an icon bar, a scrubhead and a playhead extending across the plurality of timelines wherein the scrubhead describes a current edit position on the timelines and a playhead describes a current point in time on the timelines where video is being output from the video editing system and wherein the scrubhead can be moved independently of the playhead;

representing a clip as a timeline;

displaying metadata corresponding to the clip at the time indicated by a temporal location of the Scrubhead location on the timeline of the clip;

simultaneously displaying a media frame from additional media sequences on additional timelines of the plurality of timelines, where the clip and additional media sequences are all different and where the displayed metadata and frames are selected from a single point in time among the timelines that is identified by a location of the scrubhead; and editing the metadata clip based upon the simultaneously displayed media frames on the icon bar.

35. A method of computer editing a plurality of media clips comprising:

on a monitor displaying a time rectangle with a plurality of temporally overlapping parallel timelines where each timeline represents a media clip of the plurality of media clips, an icon bar and a scrubhead extending across the plurality of timelines;

simultaneously displaying a media frame from each of the plurality of media sequences within the icon bar, where the plurality of media sequences are all different and where the displayed frames are selected from a single point in time identified by a location of the scrubhead;

a playhead that extends across the plurality of timelines wherein the scrubhead describes a current edit position on the timelines and a playhead describes a current point in time on the timelines where video is being output from the video editing system and wherein the scrubhead can be moved independently of the playhead; and editing the playback timeline based upon the simultaneously displayed media frames on the icon bar.

36. A method of editing video sequences, such method comprising:

providing a display with a plurality of audio/visual sequences depicted on the display and where each audio/visual sequence of the plurality of audio visual sequences is displayed as a timeline along a first axis and where each position along the timeline corresponds to a temporal location of audio/visual information within the audio/visual sequence and where the plurality of audio/visual sequences overlap along the first axis;

providing a vertical line that defines a scrubhead location, the vertical line adapted to be dragged along a second axis that is orthogonal to the first axis over the timelines of the plurality of audio/visual sequences; and simultaneously displaying audio/visual information from each of the plurality of audio visual/visual sequences on the display where the displayed information corresponds to a location of the vertical line along the audio/visual sequence wherein the scrubhead describes a current edit position on the timelines and a playhead describes a current point in time on the timelines where video is being output from the video editing system and wherein the scrubhead can be moved independently of the playhead.

\* \* \* \* \*